(12) United States Patent
Srivastava

(10) Patent No.: US 9,569,332 B2
(45) Date of Patent: Feb. 14, 2017

(54) SYSTEM AND METHOD FOR INVESTIGATING ANOMALIES IN API PROCESSING SYSTEMS

(71) Applicant: Apigee Corporation, San Jose, CA (US)

(72) Inventor: Kumar Srivastava, San Jose, CA (US)

(73) Assignee: Apigee Corporation, San Jose, CA (US)

(*) Notice: Subject to any disclaimer, the term of this patent is extended or adjusted under 35 U.S.C. 154(b) by 97 days.

(21) Appl. No.: 14/170,656

(22) Filed: Feb. 3, 2014

(65) Prior Publication Data

US 2015/0220376 A1 Aug. 6, 2015

(51) Int. Cl.
*G06F 11/00* (2006.01)
*G06F 11/32* (2006.01)
*G06F 11/34* (2006.01)

(52) U.S. Cl.
CPC .......... *G06F 11/327* (2013.01); *G06F 11/3409* (2013.01); *G06F 11/3452* (2013.01); *G06F 11/3466* (2013.01)

(58) Field of Classification Search
CPC .. G06F 11/302; G06F 11/3409; G06F 11/3428
USPC .................................. 714/47.2, 47.3
See application file for complete search history.

(56) References Cited

U.S. PATENT DOCUMENTS

| | | | |
|---|---|---|---|
| 5,559,958 A * | 9/1996 | Farrand ............... | G06F 11/0709 709/223 |
| 7,643,457 B2 * | 1/2010 | Pinault ......................... | 370/338 |
| 7,694,128 B2 * | 4/2010 | Judge .................... | H04L 12/585 380/282 |
| 8,229,998 B2 * | 7/2012 | Choi et al. .................... | 709/201 |
| 2006/0212917 A1 * | 9/2006 | Boucher et al. ............. | 725/105 |
| 2011/0119374 A1 * | 5/2011 | Ruhl .................... | G06F 17/3089 709/224 |
| 2011/0154130 A1 * | 6/2011 | Helander ................ | G06F 21/51 714/48 |
| 2013/0007245 A1 * | 1/2013 | Malik ................. | H04L 41/0816 709/223 |
| 2013/0111467 A1 * | 5/2013 | Sundararaj ..................... | 717/176 |
| 2013/0212603 A1 * | 8/2013 | Cooke et al. ................. | 719/328 |
| 2014/0282626 A1 * | 9/2014 | Muguda ........................ | 719/328 |
| 2015/0222504 A1 * | 8/2015 | Srivastava .......... | H04L 43/0823 709/224 |

* cited by examiner

*Primary Examiner* — Elmira Mehrmanesh

(57) ABSTRACT

A method is provided for detecting irregularities of one or more application programmer interface (API) entities. The method includes receiving a request for data of one or more API entities. The method further includes monitoring said data from at least one server and detecting irregularities in the data. The method also includes displaying information pertaining to the irregularities to a user.

18 Claims, 7 Drawing Sheets

SYSTEM AND METHOD FOR INVESTIGATING ANOMALIES IN API PROCESSING SYSTEMS

FIELD OF THE INVENTION

The present invention generally relates API processing systems, and more particularly to investigating anomalies in API processing systems.

BACKGROUND OF THE INVENTION

An Application Program Interface (API) is a programming language format used by an application program to communicate with an operating system or other control programs such as a database management system (DBMS) or communications protocol. An API typically includes a library of components such as routines, protocols and tools for building software applications. The components may be software functions and processes such as executable code or scripts. In the case of "Web APIs", the APIs may be exposed over a network such as in a web page or desktop application that access API over the Internet. Most operating environments such as Windows, Unix, Linux, or like systems provide API components so that developers can run and execute applications consistent with the operating environment.

APIs allow developers to create application software (i.e. an "app") which can communicate directly with a particular operating system or computer platform by integrating functions from the operation system's API library into the application software. The term app can refer to mobile applications that utilize APIs. Developers may implement apps in various programming languages using various platforms. Therefore, APIs enable app developers to easily access and reuse application logic built by other developers.

More recently, developers may use a software development kit (SDK or devkit) to build applications and APIs for operating systems and/or platforms. An API proxy may be a type of application that runs on a SDK acting as a means for communicating between servers and one more web APIs, generic HTTP services, or applications. Such a proxy can be implemented as a set of configuration files and software code which rely on resources provided by the SDK.

In addition, web based APIs may be provided to developers in order to integrate services between two or more HTTP enabled services. These combined services may be referred to as a "mashup." For example, Housingmaps.com is a mashup that applies real estate information, such as apartments for rent or homes for sale from craigslist.com to Google Maps. The mashup results in a system that allows the user to sort apartments and homes by price and location onto an interactive map, allowing for efficient browsing of housing options.

One issue with present approaches to gathering and analyzing API information is that there lacks a sufficient way to monitor and analyze API traffic for unexpected changes or irregularities, e.g. spikes or drops, that flow through APIs. Tracking such changes of when and how API traffic changes allows API developers and providers to react to unplanned changes in traffic and take corrective actions to improve APIs and make better decisions related to API programs. It is therefore desirable to offer a system for monitoring and regulating unexpected anomalies in API traffic in a manner that provides useful knowledge of API performance to developers and API providers.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to one embodiment of the present invention, a method for detecting irregularities of one or more application programmer interface (API) entities is provided. The method includes receiving a request for data of one or more API entities. The method further includes monitoring said data from at least one server and detecting irregularities in the data. The method also includes displaying information pertaining to the irregularities to a user.

According to another embodiment of the present invention, an application program interface (API) analytics system for detecting irregularities of one or more application programmer interface (API) entities is provided. The system includes an API gateway receiving a request for data of one or more API entities. The system also includes a processor monitoring said data from at least one server and detecting irregularities in the data. The system further includes a display unit displaying information pertaining to the irregularities to a user.

These and other aspects, objects, and features of the present invention will be understood and appreciated by those skilled in the art upon studying the following specification, claims, and appended drawings.

DETAILED DESCRIPTION

Figure 1:
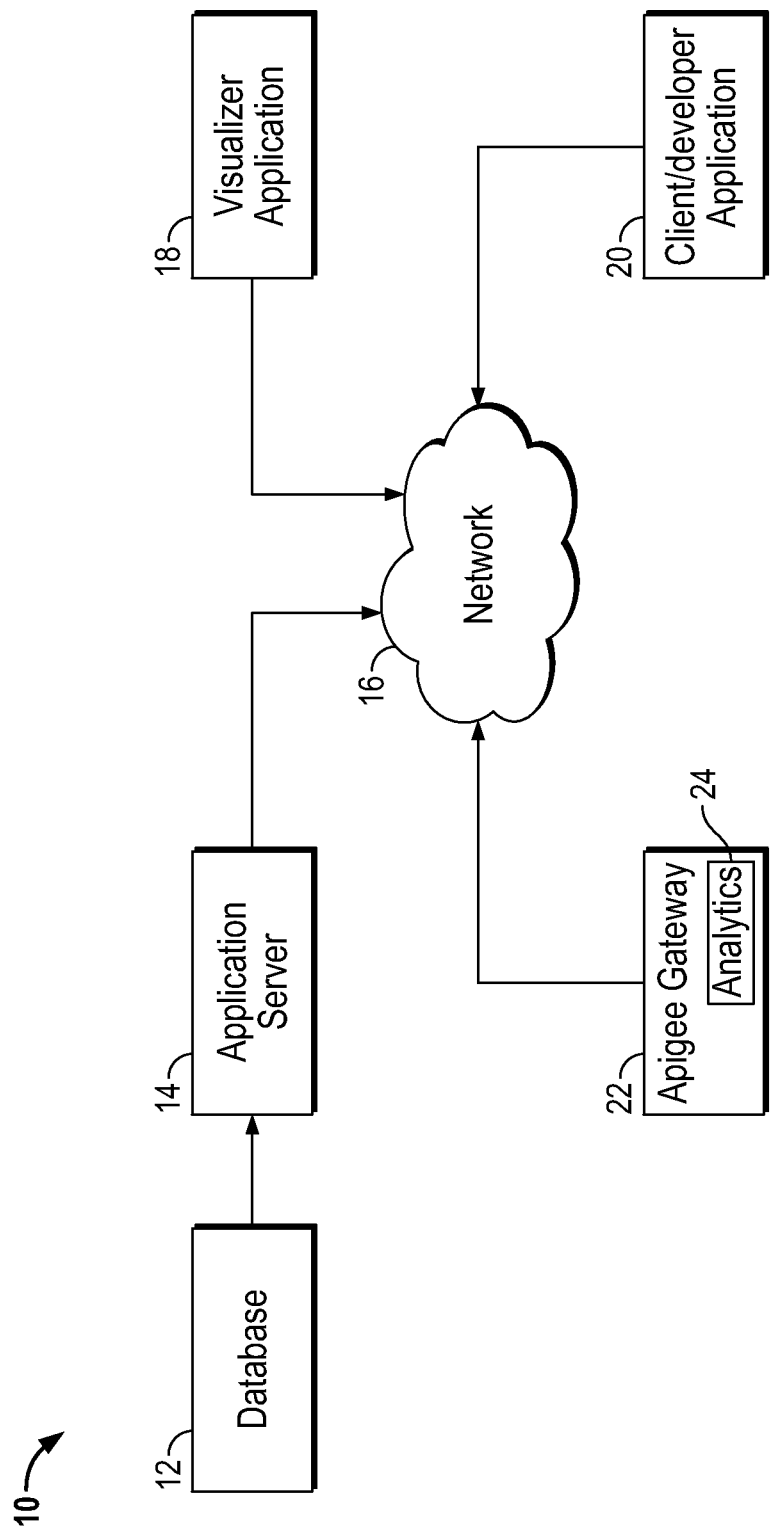
FIG. 1 illustrates a block diagram of an API analytics system including a gateway application that monitors and controls API traffic according to an illustrative embodiment of the invention.

FIG. 1 is a block diagram of an API analytics system 10 including an Apigee® gateway proxy 22 that monitors and controls access of "API Entities" according to an illustrative embodiment of the invention. "Entities" may be any elements or actors which are part of the API ecosystem 10 including users, applications, devices, network between devices and the gateway, components of the gateway API, backend services, and the network between the gateway and the backend service, etc. The system 10 includes a database 12 containing API entity information, application server 14, network 16, visualizer application 18, client/developer application 20, and Apigee® gateway 22 with analytics monitor/control 24. The system 10 may also include remote developer systems and user controlled devices such as a mouse and keyboard. The visualizer application 18 may include a graphical user interface (GUI) such as a web browser.

In the preferred embodiment, proxy 22 may receive requests to access system 10 from developers via a client application 20. Once a request is accepted, the gateway 22 may communicate with application server 14 to retrieve requested API information from database 12. The gateway proxy 22 may then retrieve requests from client application 20 to server 14 and return responses from server 14 back to the client application 20. Thus, the gateway proxy 22 may provide the artifice that the client application 20 is communicating directly with a remote server 14. In one embodiment, gateway 22 acts as an entryway for developers to access to API information from database 12 in analytics system 10. During these communications and subsequent ones between server 14 and client application 20, gateway 22 may gather information regarding the traffic of the APIs including usage rates, origins of request (e.g. IP addresses or URL), kinds of API calls, frequency of the API calls, and so forth.

Database 12 may include one or more magnetic disks, tape drives, disk drives or other mass storage for storing data and instructions for use by system 10 in a computer system. At least one component of the database 12, preferably in the form of a disk drive or tape drive, stores the information used for processing the system 10. The database may also include one or more drives for various portable media, such as a floppy disk, a compact disc read only memory (CD-ROM), or an integrated circuit non-volatile memory adapter (i.e. PC-MCIA adapter) to input and output data and code to and from a computer readable media. In one embodiment, the database includes a plurality of storage devices or media that are interconnected via a communications network. The plurality of storage media may interact such that the storage media function as a virtual mass storage system. One or more of the plurality of storage media may reside in separate locations while being interconnected electronically.

In some embodiments, when an irregularity in API traffic is detected during exchanges between the application server 14 and client/developer application 20, the gateway proxy 22 may collect entity information related to these communications to analysis and correct for unexpected spikes or drops in traffic. Such corrective actions, which may be automatic or user controlled, may include blocking certain users from access, adding more processing bandwidth, revoking developer keys, rerouting traffic or implementing additional gateway changes, and the like. The information gateway 22 collects as data passes through includes API call information (URL, IP, and user ID), latency, errors and so forth. The data may be gathered into trend charts and tables throughout an API Platform UI. The user may use this data to monitor the health of the API program and health of individual API.

The system 10 may allow web systems to make their services available on network 16 so that their services may be consumed by developer apps 20 running on mobile devices and desktops. For example, a service provider may wish to share their services 12 that provide product pricing, availability information, sales and ordering services across system 10. In some embodiments, server 14 and client 20 employ applications employing asynchronous JavaScript+ XML (Ajax) and other technologies using asynchronous loading and content presentation techniques, for example SHTML, document object model (DOM), JavaScript. Web based applications may use web protocols including services oriented access protocol (SOAP) and representational state transfer (REST). A service provider may share their services in database 12 as a set of HTTP endpoints in communication with application server 14. Client app developers may then make HTTP requests via Client/developer application 20 to these endpoints. Depending on the endpoint, application server may then return data formatted as XML or JSON back to developer application 20. The client created apps 20 which consume these services can be implemented as stand-alone applications of mobile devices or tables such as HTML5 applications running in a web browser, or any other type of application that can make a request to the HTTP endpoint and consume response data. Such client applications 20 may be developed and released by the same provider which shares their services 12 on system 10, or by a third party application developer who makes use of publicly available services. Application server 14 may include a server running Web 2.0 application or the like. Connected and in communication with system 10 may be a device capable of running a browser that supports Web 2.0 such as a cell phone, laptop, and the like. Web applications running on server 14 may use server-side dynamic content generation such as CGI, PHP, ASP or Java servlets, for example.

System 10 may act as a service provider, creating and maintain services that developers use to create client apps 20. In a preferred embodiment, system 10 may provide secure access to services with a defined API that is consistent across services, regardless of service implementation. A consistently defined API may allow app developers to consume services, enables changes to a backend service implementation without affecting public API, enables taking advantage of the various analytics 34 built into gateway server 22 of system 10.

In addition, gateway proxy 22 may function as a mapping of publicly available HTTP endpoint to a company's web page backend service (e.g. ESB, SOA, App Servers). Since app developers may make HTTP requests to proxy 22, rather than directly to the service provider's services, developers need not know the specifics of implementing such services. The developer may simply need to know the URL of the API proxy endpoint, query parameters, heads or body parameters passed in the request, and any required authentication and authorization credentials of system 10. In addition, developer may need to know the HTTP response information including response data format such as XML or JSON. Therefore, gateway proxy 22 may isolate app developer and developer application 20 from the backend service. This allows service providers to move services to a new host or make any other changes to the service implementation. In addition, gateway proxy 22 allows for adding increased functionality to the proxy 22 without making changes to the backend service. For example, service providers may add policies to their proxy to perform data transformations, filtering, added security, execute conditional logic or custom code, and to perform many other actions.

In another embodiment, system 10 may provide developer services for API creation and development of client applications 20. A service provider may choose to build API proxies using APIs, SDKs and other convenience services as an app developer. Application server 14 may provide the necessary tools for adding and configuring API proxies, setting up API products, and managing developers and client applications 20. Thus, server 14 may offload many common management concerns from backend services.

In other embodiments, gateway 22 provides security, rate-limiting, caching and so forth. The behavior of gateway 22 may also be customized by applying custom strips and making calls out to a third party API and services. In addition, a cloud-based backend service may be provided on network 16 via client/developer application 20 for powering mobile and web applications. The cloud-based backend service may give developers access to flexible data store and key differentiating features such as social graphs, geolocation, user management, push notifications, and performance monitoring. The cloud-based backend service may be available with SDKs for iOS, Android, JavaScript, and others, thereby allowing developers to create applications without implementing a core backend service and infrastructure.

In some embodiments, visualizer 18 may include internet browser software and the gateway proxy 22 may be configured as a server capable of interpreting web protocols that may be used by visualizer 18 and client application 20. For example, such protocols may include Hypertext Transfer Protocol (HTTP), File Transfer Protocol (FTP), Telnet, and Secure Sockets Layer (SSL) and so forth.

The foregoing embodiments of system 10 may be realized as a software component operative within an operating system such as, without limitation, Windows or Unix or Linux. In such an embodiment, proxy 22 can be implemented in a high level computing language such as C, C++, Fortran, or Java or Visual BASIC. In addition, script based programs may be used such as PHP, WML, and so forth.

Figure 2:
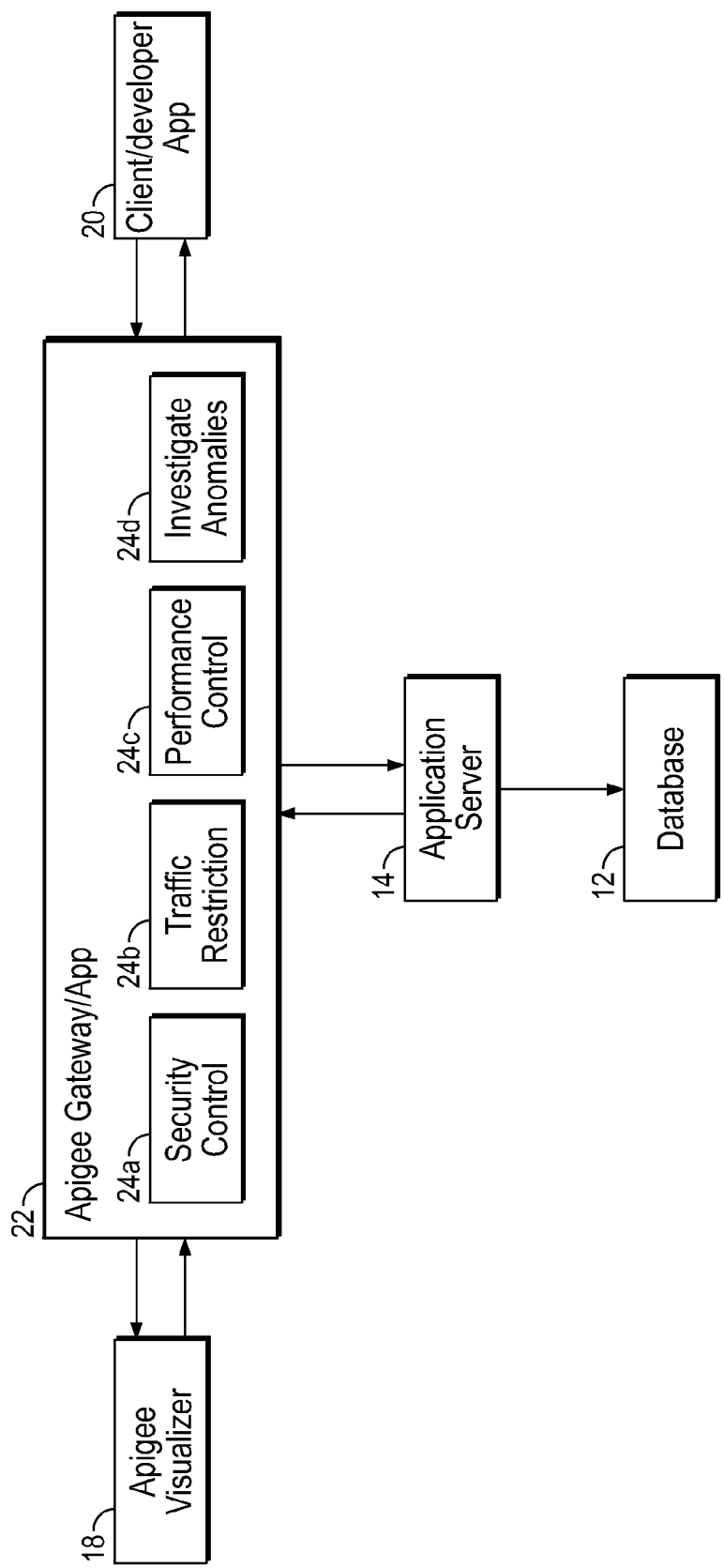
FIG. 2 illustrates a block diagram of the gateway application according to an illustrative embodiment of the invention.

FIG. 2 is a block diagram of block diagram of the gateway proxy 22 with analytics components 24 and visualizer 18 according to an illustrative embodiment of the invention. The visualizer application 18 may be a software application running on any one or combination of the application server 14, client application 20 or proxy 22 in system 10. The visualizer application 18 may interface with a GUI to enable interaction with a user and may also be executed on a portable computing device such as a laptop, cell phone, PDA or other devices that can communicate remotely with gateway 22.

In preferred embodiments, the analytics system 24 in communication with visualizer 18 provides tools to observe short and long term usage trends for API entities in the API Ecosystem. As data passes through proxy 22, several types of information may be collected such as URL, IP, user ID for API call information, latency, and error data. In addition, developers may create programs called "policies" to add additional information, such as headers, query parameters, portions of a request or response extracted from XML or JSON. Such information may be collected asynchronously from actual request/response flow and therefore has no effect on API performance.

Analytics services 24 may collect and analyze, in real time, several kinds of information that flow through APIs in network 16 such as URL, IP, user ID for API call information, latency, and error data. The data analysis may include determining API traffic trends over time, top developers, when API response time is fastest, geographically where API traffic is highest. Such continuous data analysis may help service providers improve their APIs, troubleshoot problems and make better business decisions with their API program such as how much API traffic capacity may be needed in the future. API data may be sorted using a query parameter as part of a request by client or service provider. The parameter may enable filtering of statistics for a list of API entities that enable a particular condition (e.g. top developer as measured by throughput or worst performers as measured by target API latency). Query parameters may define attributes of chosen dimension used to calculate statistics (metrics), calculations run against the metric defined for the dimension (functions), time intervals over which data should be analyzed (time ranges) and attributes used to simply or sort across results (filters). A client/developer may access these metrics via a visualization API which can automate certain analytics functions, such as retrieving metrics periodically using an automation client or script. In addition, the visualization API may be built by the client/developer in the form of custom widgets which can be embedded in portals or custom apps.

The analytics system 24 via visualizer 18 may allow for performing and visualizing analytics management through a GUI such as a web browser. The GUI may provide tools to visualize trends in API performance of system 10 including a dashboard view, performance view and custom reports. The dashboard view may give a high-level view of data flowing in ecosystem 10 including performing APIs, apps, developers and API products in real time. Under a resource performance view, the user may track performance metrics for individual resources for a specific APIs. This view may let the user plot trends in traffic, response time and other metrics for each individual resource in the system 10. During this view, users may monitor specific API entities for anomalies in traffic which will be explained in more detail below with respect to FIGS. 4-7. Additionally, a custom report feature may allow users to select, combine, filter specific API metrics viewable in the GUI. The analytics summary reports may be generated periodically and system users may be automatically subscribed to receive reports through email. A user may unsubscribe to such reports through a link on the summary report. In addition, system users may export the reports to CSV, PDF, or PNG format wherein each report may include an export menu where user can select a format for the export.

Various metrics may be available to monitor API performance and specifically anomalies in API traffic, including traffic, average response, average target response time, average endpoint response time, maximum response time, error rate and average data exchange. "Traffic" may be defined as throughput or the number of API requests and resulting responses over a period of time by system 10. The "average response time" may be defined as the time an API takes to respond to incoming requests. The "average target response time" may be defined as the time that elapses between a request to enter system 10 from gateway 22 to the response arrive at the 22 from system 10. The workflow for servicing of an API request may be as follows: 1) A request from an app is received by the gateway 22; 2) The request enters system 10, is processed, and then exits the gateway; 3) The request enters system 10 after exiting gateway 22; 4) The response from the system 10 is sent to the entity endpoint; 5) The response from the system 10 endpoint is sent to the gateway 22; 6) The response from the gateway 22 is sent to the external app. The average endpoint response time may be defined as the average time it takes the target endpoint to respond to an incoming request for the selected period. The maximum response time may be defined as the slowest response time for the selected period. The error rate may be the fraction of all API requests that are unsuccessful, that is, the request does not deliver a response as desired by the user. The average data exchange may be defined as the size of the request and response, i.e. the amount of data that is transferred in both directions as a request for an API service and a response generated and delivered to the calling entity.

An anomalies analytics unit 24d within the gateway proxy 22 may regulate API traffic by tracking API access information over a predetermined period of time. For example, the investigation analytics 24d may capture such API information pertaining to entities accessing the API calls such as a tracked backend service, application, app, or client/developer during the traffic irregularity periods. As will be explained in greater detail below, gateway proxy 22 may calculate traffic irregularity periods and display traffic patterns before, at and after data irregularities via visualizer 18. The anomalies may be displayed by app, developer, client IP address, or target URL.

In a preferred embodiment, analytics system 24 within proxy 22 may perform automatic or user driven corrective actions to limit future irregularities in detected API traffic. Analytics unit 24 within proxy 22 may provide several units enabled to take the corrective actions via such as a security control unit 24a, traffic restriction unit 24b, and performance control unit 24c. Security control unit 24a may limit future spikes or drops in traffic by revoking and/or regulating access of developer keys or blocking access of IP addresses detected as causing spikes or drops in API traffic. Security control may involve limiting access of one or more API developer keys or IP addresses to certain API entities or functions. For example, gateway application 22 may regulate access to an API due to an identified IP address of API call or geographical location of the API call or header in the call signifying a particular developer. Other entities that may be regulated by security control unit 24a in making access to API information in ecosystem 10 include the client/server application or backend service or format of the data making the API request. In another embodiment, proxy 22 may provide enhanced security and encryption. Enhanced security may include cryptographic authentication, message integrity checking, encryption, and other like services. The security may include protocols such as IPSEC and IKE. The encryption may include DES AES, RSA and other public key or private key systems.

In another embodiment, gateway application 22 may provide a traffic restriction unit 24b. The traffic restriction unit 24b may limit future spikes or drops in traffic by turning off access to APIs from a developer's account once a threshold of API requests from a developer's account has been detected. Such a predetermined threshold may be a number of API calls by an IP address or developer account counted by a counter in system 10 within a predetermined time frame, e.g. 12 hours. Once this predetermined threshold is met, traffic restriction unit 24b may turn off access of API entities by the IP address or developer account. In addition, if the threshold of API calls is met, the traffic restriction unit 24b may limit future access of API entities such as controlling the number of times and API can be accessed by a given developer application 20.

Analytics unit 24 may also limit future irregularities in API traffic by providing a performance control unit 24c. Once anomalies in traffic are determined, the performance control unit 24c may reroute API access requests via a conditional algorithm for traffic flow or calculate and provide more processing and bandwidth for traffic such as caching. Analytics units 24a-24b may be implemented as an separate application or a routine of gateway 22.

Figure 3:
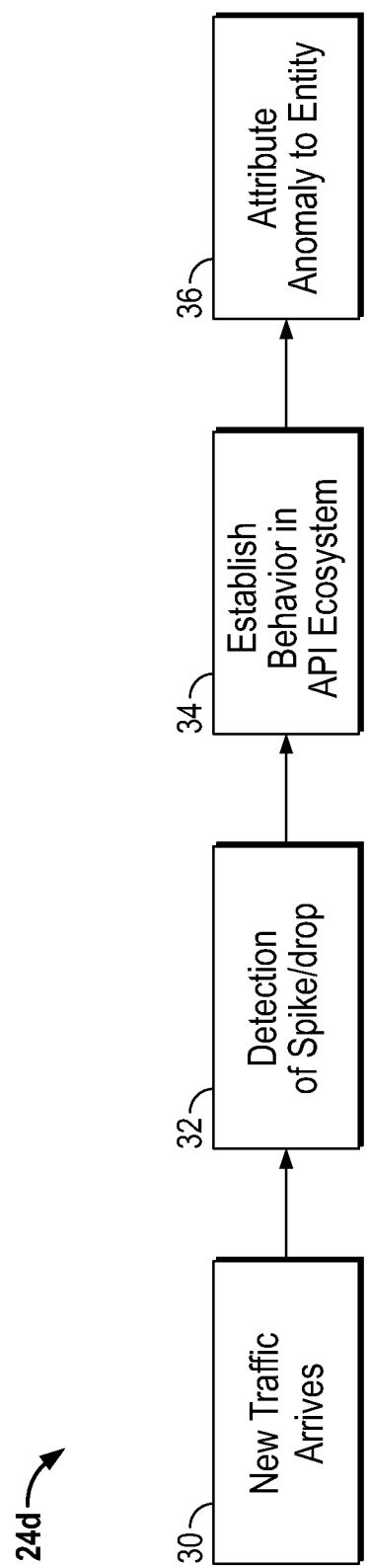
FIG. 3 illustrates a block diagram for detection and correction of irregularities in an API ecosystem according to an illustrative embodiment of the invention.

FIG. 3 illustrates a block diagram for detection and correction of irregularities of API entity traffic in ecosystem 10 according to an illustrative embodiment of the invention. Initially, in step 30, API gateway 22 receives new traffic, at a predetermined frequency, pertaining to the usage data of one or more API entities from a client developer 20, application server 14 or a plurality of other applications or servers within the API ecosystem 10. Once the newly arrived API data has been received by proxy 22 in step 30, unit 24d measures the usage data and compares the data to a predetermined baseline value in step 32. The baseline value may be calculated by previously tracking and storing the daily moving average of API traffic for one or more API entities. The daily moving average may be calculated based upon averaging the amount of total received data over a predetermined period of time, for example daily average=(computed total monthly traffic for one or more API entities)/(measured days in the month). In step 32, the newly arrived traffic pertaining to data of one or more API entities may be scanned and measured for a predetermined period, e.g. 5 mins. During the scanning, the newly arrived traffic may be measured against the calculated baseline average to determine if there are one or more irregularities in the API ecosystem, i.e. a determination of a "spike" or "drop" in traffic relative to the predetermined baseline. For example, if it is determined that the newly arrived traffic is at least three times greater or smaller than the baseline moving average, then a "spike" or "drop" has been found in step 32.

Once a determination of "spike" or "drop" in traffic is found in step 32, in step 34, unit 24d measures the traffic during a time before, during and after the "spike" or "drop" in order to establish the behavior of various entities in the API ecosystem. Behavior of various API entities may be established by tracking the traffic of individual API calls, backend URL information and other behavior in the API ecosystem during the selected period of time surrounding discovery of individual anomalies, e.g. spikes or drops in traffic. In step 36, unit 24d analyzes the gathered data from step 34 in order to attribute one or more anomalies in data to a change in behavior of a specific entity in the ecosystem. For example, developers or IP addresses or other API entities which accounted for the highest share of traffic variation during the periods of spikes or drops may be flagged as "attributing" to a spike or drop in traffic. The flagged data in step 36 may be monitored and displayed onto a GUI via communication between gateway 22 and visualizer application 18 showing the primary entities (e.g. developers, target URLs, applications, other API entities) responsible for the traffic irregularities to a user or developer.

Figure 4:
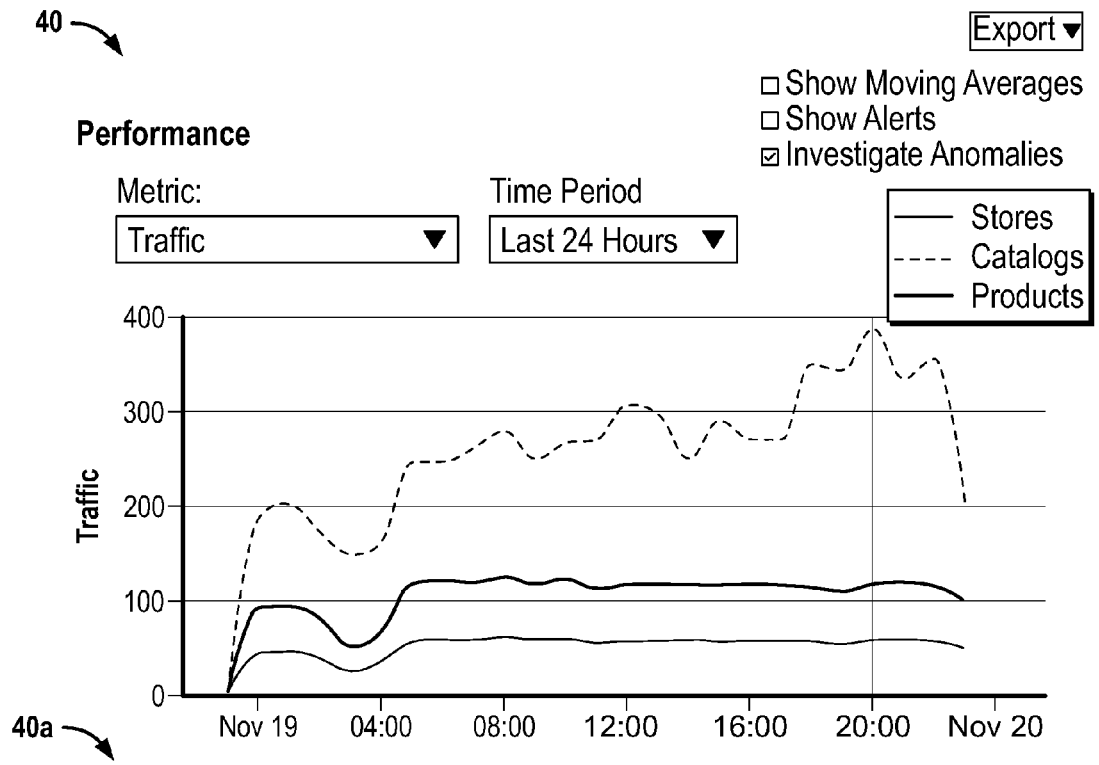
FIG. 4 illustrates a graphical user interface (GUI) displaying irregularities in API data due to one or more detected backend services according to an illustrative embodiment of the invention.
Figure 4:
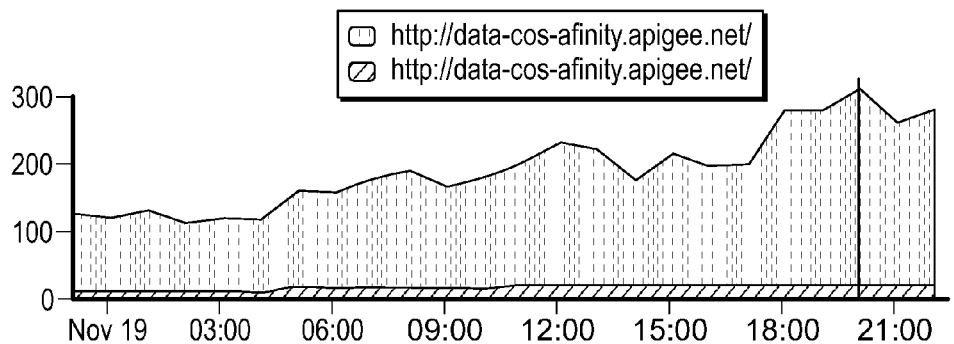

FIGS. 4-7 show displaying detected irregularities in API traffic caused by particular kinds of API entities running within API ecosystem 10 according to illustrative embodiments of the invention. FIG. 4 shows GUI 40 displaying irregularities in API traffic due to one or more backend services according to an illustrative embodiment of the invention. A backend service may be an application or program running in system 10 that indirectly services in support of front-end services (i.e. ones users interact with directly) usually by being closer to the required resource or having the capability to communicate with the required resource. The back-end application may interact directly with the front-end or, perhaps more typically, is a program called from an intermediate program that mediates front-end and back-end activities. As shown in FIG. 4, the backend service may be a target URL which may act as an application server system 10 for storing API entity information that is called upon by developers.

Figure 5:
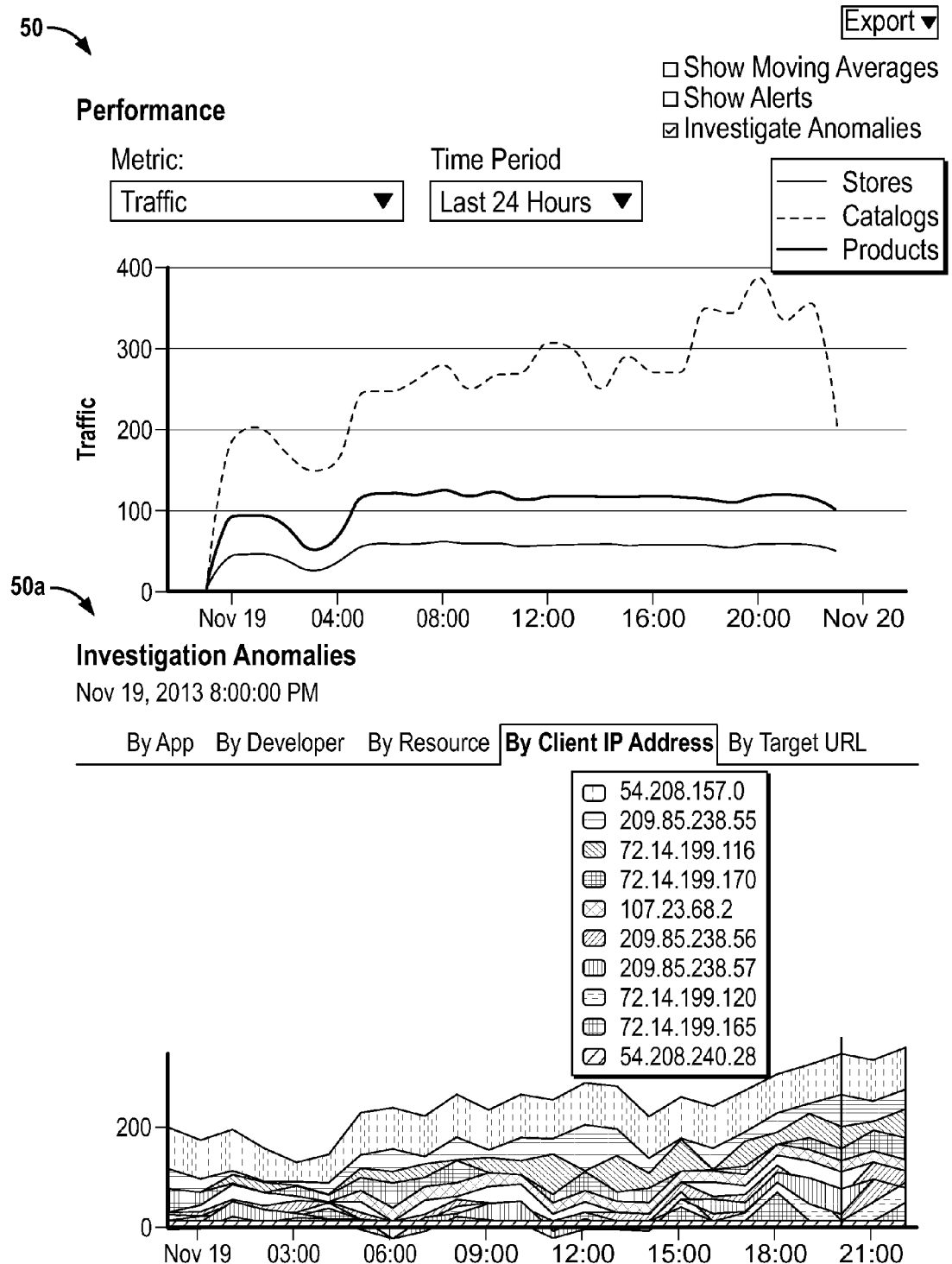
FIG. 5 illustrates a graphical user interface (GUI) displaying irregularities in API data due one or more detected IP addresses according to an illustrative embodiment of the invention.

FIG. 5 shows a GUI 50 displaying irregularities in API traffic due to one or more client IP addresses according to an illustrative embodiment of the invention. The IP addresses may be the addresses from client's applications when requesting access to API information in system 10.

Figure 6:
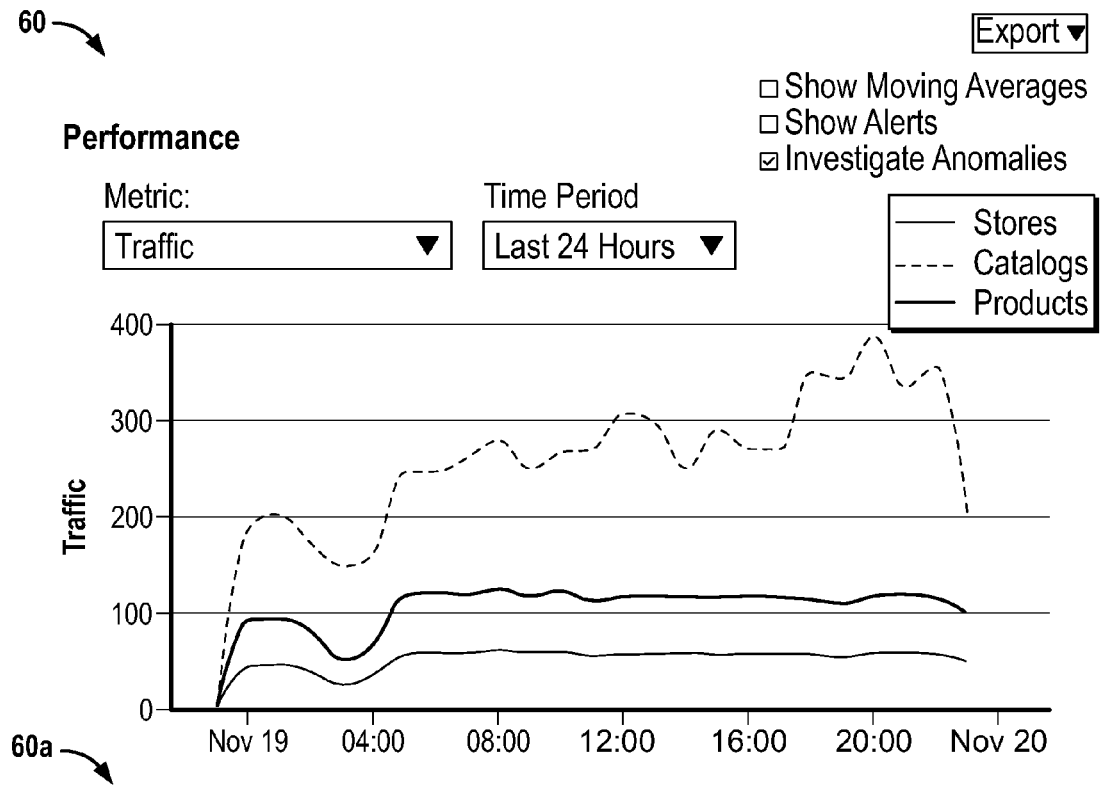
FIG. 6 illustrates a graphical user interface (GUI) displaying irregularities in API data due to one or more developers according to an illustrative embodiment of the invention.
Figure 6:
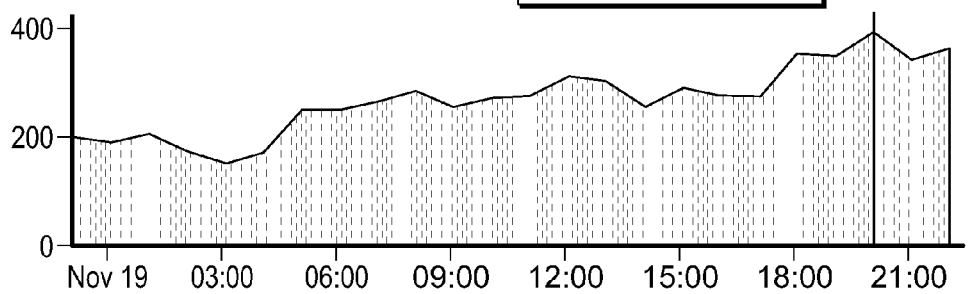

FIG. 6 shows a GUI 60 displaying irregularities in API traffic due to one or more developers accessing API information according to an illustrative embodiment of the invention.

Figure 7:
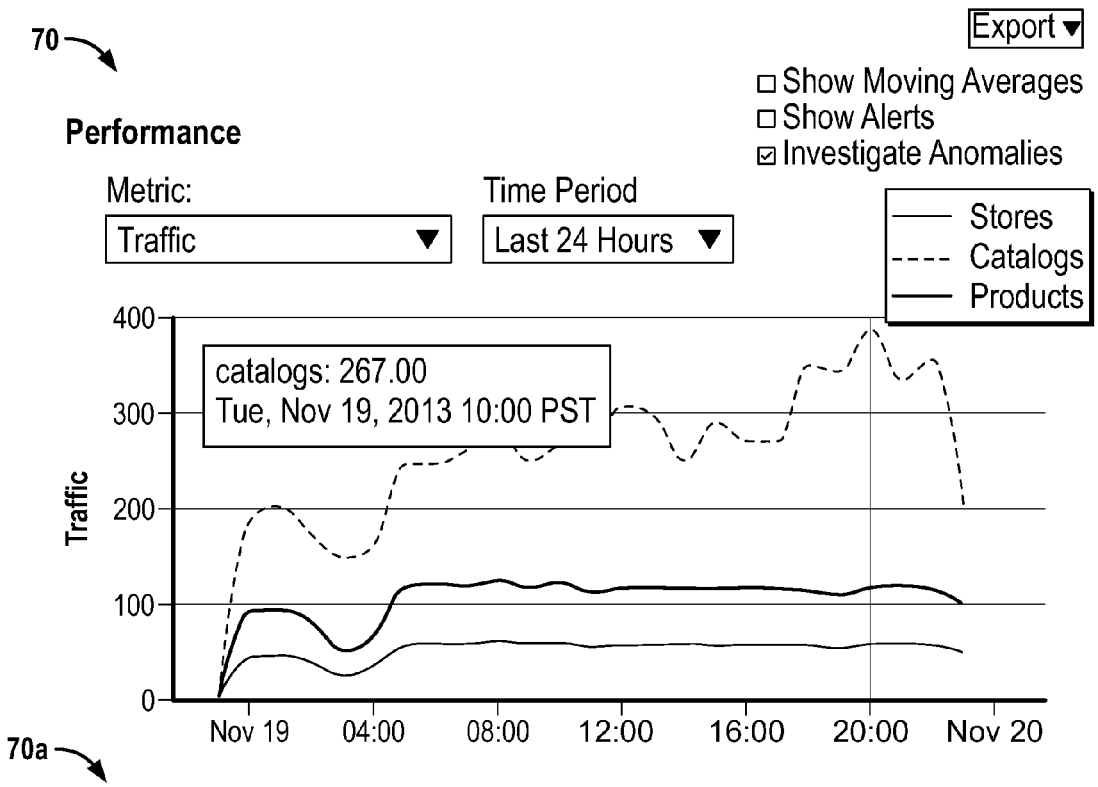
FIG. 7 illustrates a graphical user interface (GUI) displaying irregularities in API data due to one or more applications according to an illustrative embodiment of the invention.
Figure 7:
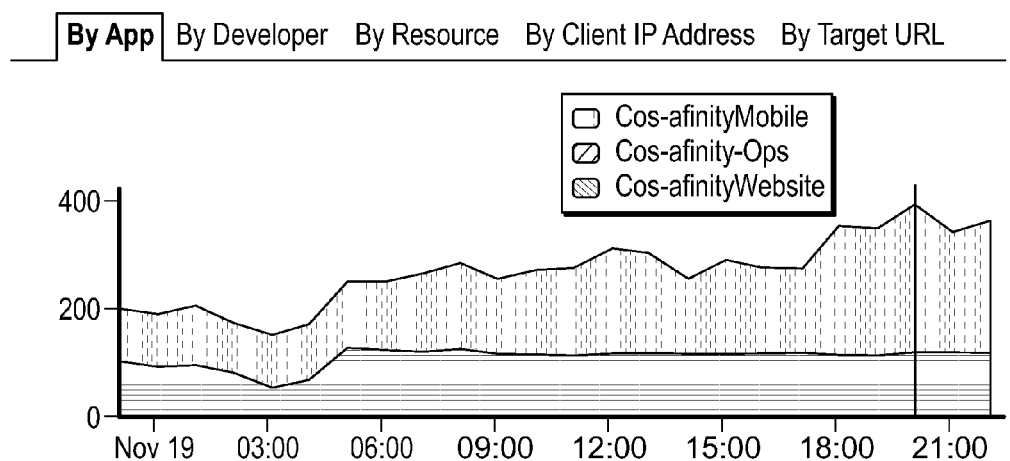

FIG. 7 shows a GUI 70 displaying irregularities in API traffic due to one or more applications according to an illustrative embodiment of the invention.

In FIGS. 4-7 GUIs 40, 50, 60, and 70 display API traffic for a time period of 24 hours selected by the user. The usage trends pertain to selected API entities labeled "stores", "catalogs" and "products," showing the peaks and valleys in traffic for each of the entities as part of the total traffic. A user may be able to select which API entities in the ecosystem to evaluate traffic and a time interval over which usage is plotted and may choose to aggregate the displayed data by minute, hour, day week or month. Additionally, a user can alternate between the API traffic monitoring metrics, as shown in FIGS. 4-7, to select performance metrics such as response time or errors per API entity by clicking on the metric drop down box. Such performance metrics may be useful for managing operational aspects of the API environment. As shown in FIGS. 4-7, if a user sees a dramatic rise (a "spike") or dramatic drop in traffic, the user can get further details by checking the "Investigate Anomalies checkbox" on the API performance chart and clicking on a point in the chart corresponding to the section which shows a spike or drop in traffic. This may activate another window displaying information pertaining to entities such as backend services 40a (i.e. target URLs), client IP addresses 50a, developers 60a, or applications 70a contributing to the anomalies in traffic. Such windows may plot the number of API access calls pertaining to such various API entities over a 24 hour period corresponding to the usage plot in the GUI. By providing the behavior pattern of entities in the API ecosystem 10 onto GUI, a user is able to visually detect the entity with the largest variation and impact in behavior during the spike/drop time period.

In addition to the Investigate Anomalies checkbox as shown in GUIs 40, 50, 60 and 70, there may be two additional checkboxes displayed on the pages to show 1) baseline moving averages and 2) alerts. Checking this box for multiple APIs allows a user to view a moving average for a set of APIs over success subsets of a complete set of traffic data. The moving average may be displayed as a band whose limits are +−20% of the calculated moving average data points. Checking the "moving averages" checkbox allows the user to visually compare and contrast a baseline moving average for API traffic with the general trend for API traffic and where anomalies in traffic are found. Checking the "alerts" checkbox allows the user to visually compare and contrast the number of times that the moving average for API traffic exceeds a particular threshold, such as +−20%.

When investigating anomalies, API "throughput" for particular API entities may be selected over a period of time. API throughout is the number of API request and responses seen by an entity over a period of time. In addition, FIGS. 4-7 may show the ratio of traffic levels for high, medium, low and inactive developers using the APIs for a selected period of time. Tracking and displaying this information may facilitate in measuring developer engagement, i.e. the percentage change of developer signups for specific periods of time, as it pertains to the kinds of spikes or drops in traffic that are detected. Moreover, traffic for top performing developer apps may be displayed to show irregularities in API due to top performing developers.

Users may select to view chart details on specific API data in a number of ways. For example, a user may hover their mouse point over the chart showing spikes or drops in data points for a popup window that displays details about the anomalies. The user may also click an icon on the API Traffic chart in GUI 40 to see data details for specific APIs. In other embodiments, the user may zoom in on charts by clicking and dragging across chart areas. The chart details popup window may identify and list statistics for APIs that have most and least traffic and most and least errors over a selected period of time.

In other embodiments, analysis of spikes or drops in API entity data may be monitored and displayed across locations. Depending on the metric the user chooses, traffic trends pertaining to API traffic or individual APIs may be filtered and displayed by country or different environments over a period of time. By selecting a message count metric in the drop down menus in GUIs 40, 50, 60, or 70, the user may filter traffic rates by individual countries over different time periods to determine which country generates the most traffic.

While exemplary embodiments of the invention have been described in connection with various computing devices and network architectures, the underlying concepts may be applied to any computing device or system in which it is desirable to implement a method for collecting and reporting API performance entities. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

I claim:

1. A method for detecting irregularities of one or more application programmer interface (API) entities comprising:
receiving a request for data of one or more API entities,
monitoring said data from at least one server,
detecting irregularities in the data by analyzing historical data to determine a baseline and said baseline is compared with current API traffic, the analyzing including (i) producing a baseline average by averaging total traffic for the one or more API entities over a period of days during which the total traffic occurred, (ii) scanning and measuring newly arrived traffic pertaining to the one or more API entities for a predetermined period of minutes, (iii) measuring the newly arrived traffic against the baseline average to determine if there are one or more irregularities therein, and (iv) identifying an irregularity in terms of one of a spike above the baseline average, and a drop below the baseline average, of a predetermined ratio greater or smaller, respectively, than the baseline average,
taking corrective action responsive to the detected irregularities, the corrective actions including revoking access of developer keys to API entities and functions, and
displaying information pertaining to the irregularities to a user in a chart;
whereby the user can click on the irregularities for further information, and can click to select one of 1) baseline moving averages and 2) alerts.

2. The method of claim 1, wherein the displaying includes displaying information on a graphical user interface (GUI).

3. The method of claim 1, further comprising attributing the detected irregularities to at least one API entity.

4. The method of claim 1, further comprising automatic or user-controlled correction of the irregularities.

5. The method of claim 1, wherein the information comprises at least one of hypothesis, validation, and corrective action pertaining to the detected irregularities.

6. The method of claim 1, wherein the irregularities include traffic spikes or drops pertaining to a change in behavior of one or more API entity.

7. The method of claim 1, wherein the baseline is determined from prior daily moving averages of traffic.

8. The method of claim 1, wherein at least one irregularity is found when current API traffic deviates from the baseline by a predetermined threshold.

9. The method of claim 1, wherein detecting the irregularities includes determining a duration of a spike or drop in data in order to establish a behavior of at least one API entity.

10. An application program interface (API) analytics system for detecting irregularities of one or more application programmer interface (API) entities comprising:
an API gateway receiving a request for data of one or more API entities,
a processor monitoring said data from at least one server and detecting irregularities in the data by analyzing historical data to determine a baseline and said baseline is compared with current API traffic, the analyzing including (i) producing a baseline average by averaging total traffic for the one or more API entities over a period of days during which the total traffic occurred, (ii) scanning and measuring newly arrived traffic pertaining to the one or more API entities for a predetermined period of minutes, (iii) measuring the newly arrived traffic against the baseline average to determine if there are one or more irregularities therein, and (iv) identifying an irregularity in terms of one of a spike above the baseline average, and a drop below the baseline average, of a predetermined ratio greater or smaller, respectively, than the baseline average, and taking corrective action responsive to the detected irregularities, the corrective actions including revoking access of developer keys to API entities and functions, and
a display unit displaying information pertaining to the irregularities to a user in a chart;
whereby the user can click on the irregularities for further information, and can click to select one of 1) baseline moving averages and 2) alerts.

11. The system of claim 10, wherein the display unit displays information on a graphical user interface (GUI).

12. The system of claim 10, wherein detecting irregularities includes attributing the detected irregularities to at least one API entity.

13. The system of claim 10, further comprising an interface for automatic or user-controlled correction of the irregularities.

14. The system of claim 10, wherein the information comprises at least one of hypothesis, validation, and corrective action pertaining to the detected irregularities.

15. The system of claim 10, wherein the irregularities include traffic spikes or drops pertaining to a change in behavior of one or more API entity.

16. The system of claim 10, wherein the baseline is determined from prior daily moving averages of traffic.

17. The system of claim 10, wherein the processor finds at least one irregularity when current API traffic deviates from the baseline by a predetermined threshold.

18. The system of claim 10, wherein the processor detects the irregularities by determining a duration of a spike or drop in data in order to establish a behavior of at least one API entity.

* * * * *

UNITED STATES PATENT AND TRADEMARK OFFICE
CERTIFICATE OF CORRECTION

PATENT NO.         : 9,569,332 B2
APPLICATION NO.    : 14/170656
DATED              : February 14, 2017
INVENTOR(S)        : Kumar Srivastava Page 1 of 1

It is certified that error appears in the above-identified patent and that said Letters Patent is hereby corrected as shown below:

In the Claims

Column 11, Claim 1, Line 22, please delete "actions" and insert therefor -- action --

Column 12, Claim 10, Line 20, please delete "actions" and insert therefor -- action --

Signed and Sealed this
Sixteenth Day of May, 2017

Michelle K. Lee
*Director of the United States Patent and Trademark Office*